INVENTORS.
WILLIAM T. FISHER
ROBERT D. THOMPSON
CHARLES B. PATTERSON
STANLEY M. DAHL
By White & Haefliger
ATTORNEYS.

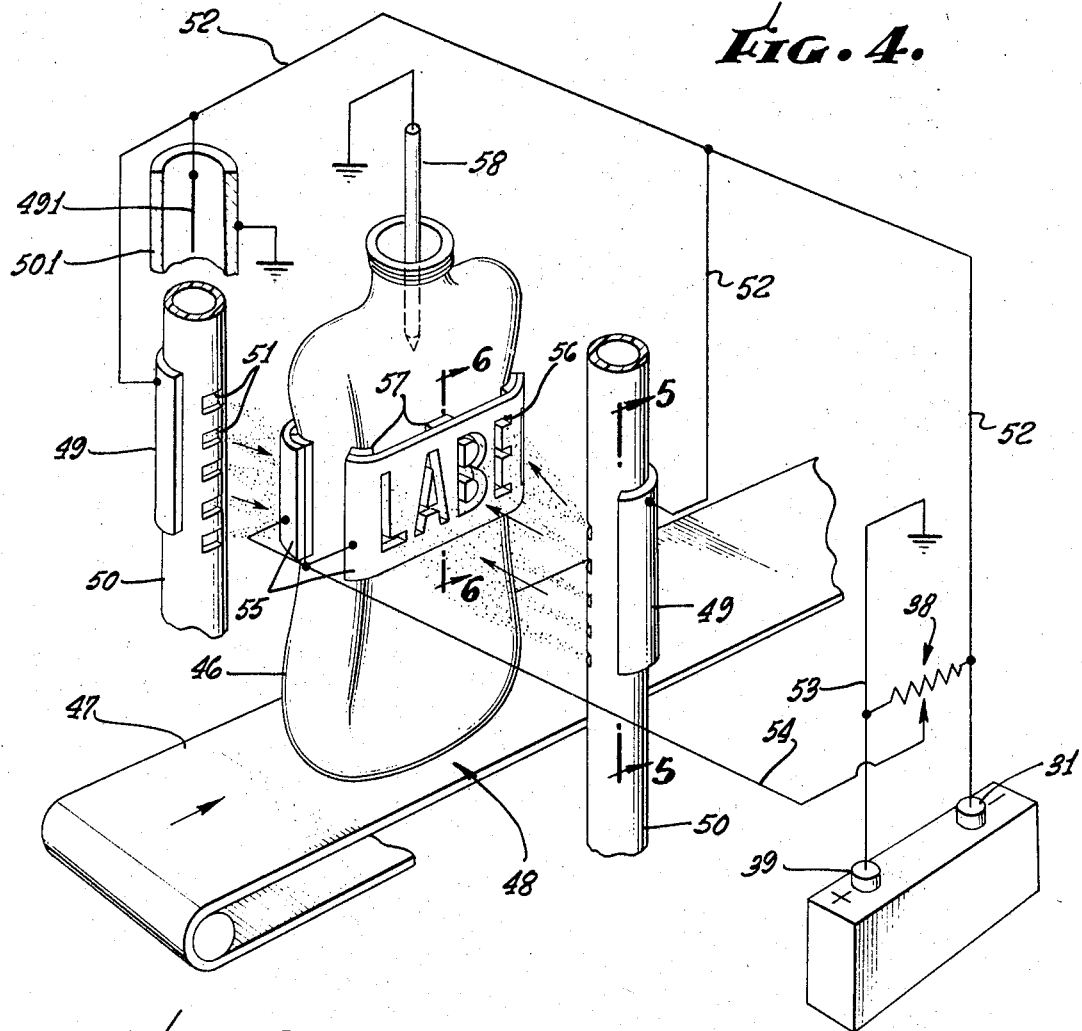
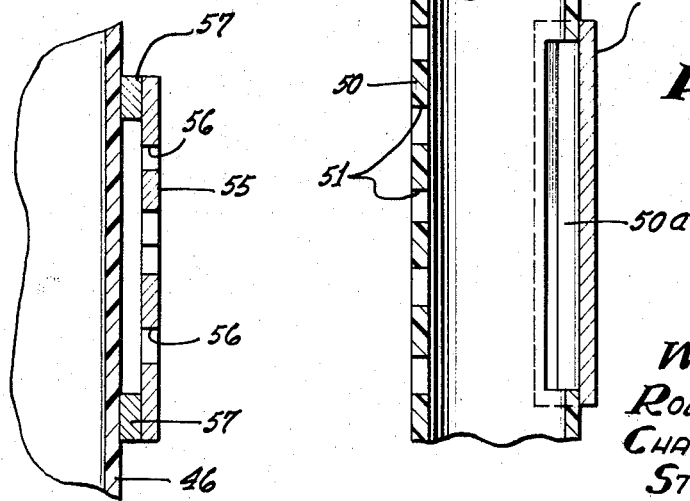

INVENTORS.
WILLIAM T. FISHER
ROBERT D. THOMPSON
CHARLES B. PATTERSON
STANLEY M. DAHL

BY *White & Haefliger*

ATTORNEYS.

INVENTORS.
WILLIAM T. FISHER
ROBERT D. THOMPSON
CHARLES B. PATTERSON
STANLEY M. DAHL
By White & Haefliger
ATTORNEYS

3,521,558
ELECTROSTATIC PRINTING WITH POTENTIAL CONTROL

William T. Fisher, Los Alamitos, Robert D. Thompson, Anaheim, Charles B. Patterson, Lakewood, and Stanley M. Dahl, Whittier, Calif., assignors to Purex Corporation, Ltd., Lakewood, Calif., a corporation of California
Continuation-in-part of application Ser. No. 651,946, July 7, 1967. This application Aug. 26, 1968, Ser. No. 767,018
Int. Cl. B41f 15/14
U.S. Cl. 101—114                  19 Claims

ABSTRACT OF THE DISCLOSURE

Highly controllable configurations in the printing of images by electrostatic deposition of particles through a stencil and onto a surface is realized by provision for independent control of the aperture area potential relative to the surface.

REFERENCE TO RELATED APPLICATIONS

This application is a continuation-in-part of our application entitled, "Method and Apparatus for Electrostatic Printing," Ser. No. 651,946, filed July 7, 1967, which in turn is a continuation of an earlier application of the same title, Ser. No. 479,461, filed Aug. 13, 1965, now abandoned.

BACKGROUND OF THE INVENTION

Field of the invention

This invention relates to the application of finely divided pigment particles by electrostatic means to electroconductive or dielectric surfaces. More particularly, the invention is directed to improved methods and apparatus for printing, decorating or to like purposes depositing fine electroscopic pigment on plane as well as curvilinear surfaces, and is applicable to the direct labeling or decoration of flat sheet, containers and other objects of irregular or intricate shape made from plastic, glass, metal or other materials.

Prior art

It is known that electroscopic toner particles may be printed on a target surface by application of the massed particles as a coating on one side of a partly masked screen employed as a stencil, the other side of which stencil is positioned opposite and in closely spaced relation to the target surface. Application of voltage differential to the stencil and the target or to a backing counter-electrode, often together with a brush or roller impact, causes the massed particles to pass through the screened stencil apertures corresponding to the subject matter to be printed, and projected through the close air gap to the target surface. A major problem with this technique is that the screen-trammelled apertures block certain of the particles which thus fail to be launched promptly and in a proper state of dispersion. Upon emergence through the screened apertures the particles may tend to adhere thereto and accumulate until they are finally launched in the less desirable form of coarse aggregates or clusters.

The prior art has emphasized the importance of a uniform field between stencil and object and in order to maintain such has provided an essentially equipotential surface opposite the object, e.g. a wire grid. In order to maintain a field which would to the object appear to be uniform the apertures in prior stencils were perforce quite small, so that field lines emanating from the stencil had approximately the spacing they would have from a solid surface. This has necessitated such small apertures in the stencil however, that particles have to be mechanically expressed therethrough. Such forcing of particle movement has caused agglomeration and clustering of particles and, as well, mechanically imparted flight direction in the electrostatic field which tended to give nonuniform printing results. The progress in the art prior to the present discovery is measurable by a chronological reading of the various Childress and related patents. Early patents employed crude brushes and screens; subsequent patents teach various expedients for eliminating the brushes, in recognition of their shortcomings. Despite such recognition, however, the solution has eluded workers in the field. It will be noted the recent patent, 3,273,496 to Melmon employs a screen for maintaining a uniform field between stencil and object.

SUMMARY OF THE INVENTION

The present invention is predicated upon the major concept, among others, of independently controlling the potential in the stencil aperture areas and for this purpose we employ an image-forming mask or stencil having untrammelled, nonreticulate apertures. The stencil apertures are free of electrical connection to the stencil so that the potential within the aperture relative to the target surface may be more, less or the same as the potential of the surrounding stencil to that surface. Variations in potential relationship provide reproducible effects on the shape of printed letters and other indicia. The apertures are capable of freely passing particulate printing pigment launched into an electrostatic field at a location spaced from the stencil side remote from the target, the pigment particles in relation to the stencil, being predispersed and thus conditioned for free passage through the stencil openings, to the end result of desirable greater uniformity and fidelity in the printed image.

Thus the invention herein disclosed takes a fundamentally different approach. Starting with the premise that elimination of the screen would avoid agglomerates and mechanical force difficulties, the problem became one of how to both eliminate the screen (to have open passages to the object through the stencil) and maintain a uniform field. The considerations seemed mutually contradictory, on the one hand an equipotential surface was required, on the other hand maintenance of an equipotential surface was not possible, if the surface was widely discontinuous. We have resolved this dilemma.

It has been discovered that open, i.e. unscreened, stencil apertures with their attendant benefits may be used, if a field distinct from the conventional stencil-object field is established. This second field is set up to exist between an electrode spaced from the stencil on the side opposite the object, and the counter-electrode associated with the object. Thus two fields, one relatively long, and the second shorter and contained therein were set up. It has been found that the field lines emanating from the spaced electrode which pass through the wide open stencil apertures are effective in compensating for the lack of stencil potential in these areas, to the end goal of a uniform field at the stencil, from the object's vantage point.

Varying potentials can be applied to the stencil for different effects, e.g. by changing the relation between the field strengths of the different fields, to alter the tendency of the widely apertured stencil to give non-uniformly dense printing across letters.

Thus creation of the required electrostatic field is effected by the application of voltage differential to what may be termed a launching electrode spaced from the stencil and at which charged pigment is launched into the field for passage through the stencil, and counter-electrode means so associated with the target surface that the stencil-passing particles are caused to deposit thereon. As will appear, such counter-electrode means may have any of various particular forms, such as the target itself where conductive or with a conductive surface, or as an electrode in effect backing the target. With particular applicability to container printing, the invention contemplates the use of a counter-electrode inserted in the container, or projected only partially therein so as to ionize fluid in the container and thus create what has been found to be an effective counter-electrode condition.

Operating in the manner indicated, the invention has for its further objects to provide for rapid successive application of separate colors to surfaces without smearing and in a manner permitting, if desired, all of the applied colors to be fixed in a single step, such printing in single or multiple colors being applicable to various dimensionally irregular shape as well as to planar surfaces, and to the simultaneous printing on plural sides of objects.

In further reference to the operative relation of the components employed in the present printing system, the invention contemplates the general relation of a launching electrode at which the pigment may be correspondingly charged and launched by any suitable means to pass through the openings of a conductive or non-conductive stencil positioned at or in relatively closely spaced relation to the target surface. For many operations it is found advantageous to provide for voltage control of the stencil in relation to the electrostatic field strength at the stencil, or to the launching electrode and counter-electrode voltage differential. Such control may be accomplished by what may be termed controllably biasing the stencil voltage in relation to the field at the stencil. In this manner we are able to achieve and assure close accuracies in printing in correspondence with the stencil opening configurations, all as will later appear.

For purposes of an important commercial usage, the invention is given specific embodiment in method and apparatus for the electrostatic printing and decoration on surfaces of containers, particularly open mouth plastic containers. In this embodiment, the invention contemplates provisions for the advancement of a succession of the containers to and from a printing station, and mechanized insertion of counter-electrodes into and out of the containers, as well as lateral displacement of pigment-passing stencils relative thereto all in timed relation with the container approaches to and departures from the printing station.

BRIEF DESCRIPTION OF THE DRAWINGS

The above mentioned as well as additional features and objects of the invention will be understood more readily and fully from the following detailed description of illustrative embodiments of the invention as shown by the accompanying drawings, in which:

FIG. 4 is a view showing diagrammatically and in perspective certain principal components and arrangements of the invention as applied to electrostatic printing on container surfaces;

FIGS. 5 and 6 are enlarged fragmentary sections taken respectively on lines 5—5 and 6—6 of FIG. 4;

DESCRIPTION OF THE PREFERRED EMBODIMENTS

Figure 1:
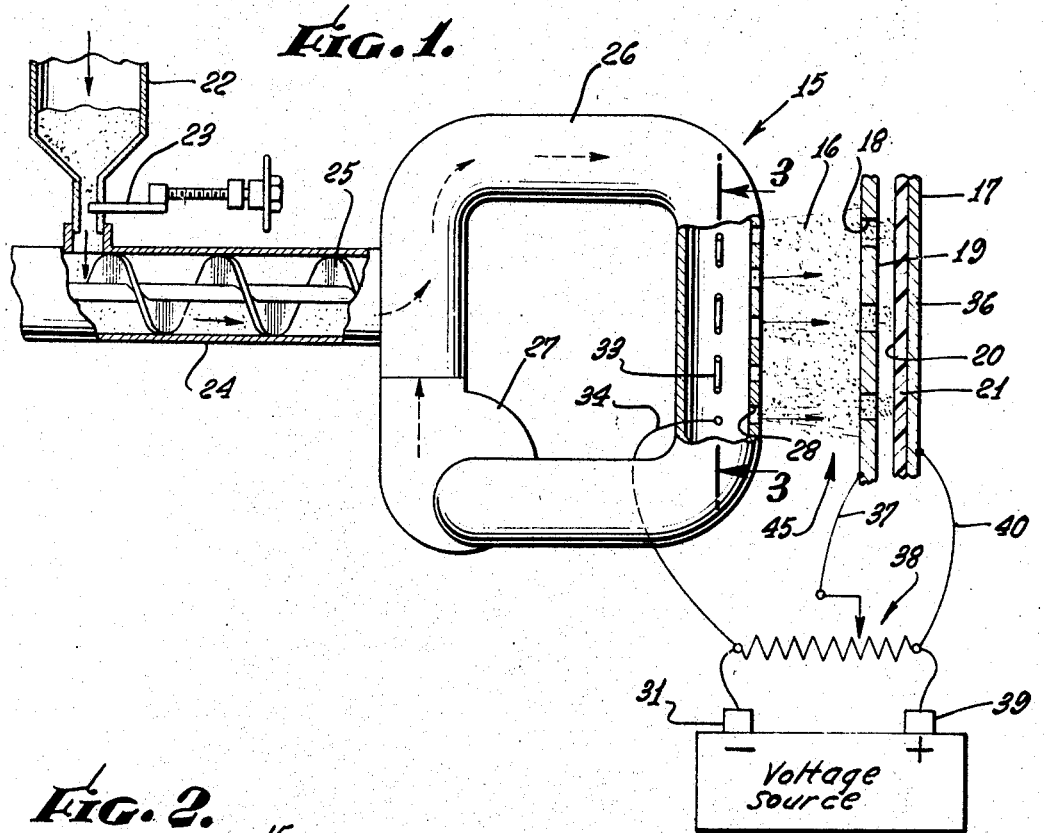
FIG. 1 is a view illustrating diagrammatically an embodiment of the invention as applied to electrostatic printing on dielectric materials.

In reference first to FIG. 1, the system there illustrated may be considered generally as comprising suitable means 15 for launching a dispersion 16 of pigment particles into an electrostatic field maintained between the launching source and counter-electrode means 17, through the apertures 18 of a partial mask or stencil 19 positioned in the electrostatic field so that preferably the apertures 18 are spaced, though closely in relation to the spacing between the launching source and stencil, from the surface 20 of the material or object 21 to be printed. The invention broadly contemplates maintenance of the electrostatic field between the launching source and counter-electrode means in any suitable manner employing appropriate voltage source connections so as to maintain between the effective launching electrode and the counter-electrode, suitable voltage potentials or differentials which, as illustrative, may range between about 20,000 to 100,000 volts and above, depending upon electrode spacings. The launching electrode may connect with either positive or negative voltage source, although for certain practical applications, negative charging of the launching electrode is preferred.

According to the illustrative arrangement of FIG. 1, suitable finely divided printable pigments are fed from a supply source 22 under control of gate or valve 23 to the barrel 24 of a screw conveyor 25 which delivers the pigment into a non-conductive closed loop duct 26 to be entrained in air stream continuously circulated within the loop by blower 27. The duct is suitably apertured at 28 so that the charged pigment particles become launched through the apertures into the electrostatic field extending through the stencil openings 18 to the target surface 20. The duct may contain, opposite or suitably in advance of the apertures 28, particle charging conductive means 33 also connected at 34 to the negative voltage terminal, such means being shown typically, see FIG. 3, to have the form of a wire grid 25 which charges the pigment particles before they are launched and dispersed at 16.

In FIG. 1, the object 21 to be printed may be assumed to be di-electric or non-conductive, and the counter-electrode means to have the form of a conductive plate 36 applied to the face of the material 21 opposite its target surface 20. Stencil 19 may be of a dielectric material, though preferably of conductive metal or any other suitable material capable of becoming electrically charged in the respect of permitting control or dissipation of such charge in relation to the total electrostatic field, particularly at the stencil location. As illustrative, the stencil is shown to be electrically connected at 37 with a potentiometer 38 interconnecting the voltage source negative and positive terminals 31 and 39, the latter also being connected at 40 with the counter-electrode 17. As will later appear, the potentiometer 38 may be varied to electrically bias the stencil 19 in relation to factors applying to the electrostatic field between the launching electrode and the target surface.

Figure 2:
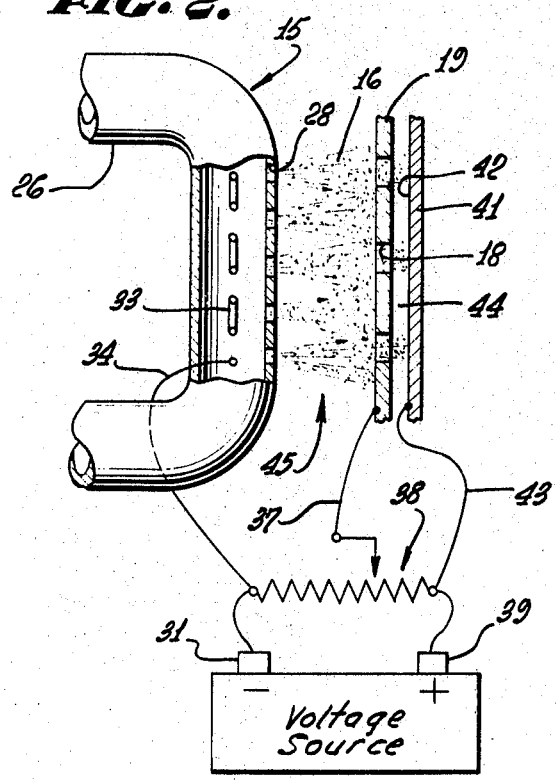
FIG. 2 is a fragmentary view similar to FIG. 1 showing illustrative of the invention as applied to printing on conductive materials.

In FIG. 2, wherein the corresponding parts are given the same reference numerals, the object 41 to be printed is assumed to be electrically conductive, or to have a conductive coating on its target surface 42, so that here the object is shown to be connected at 43 with the plus voltage terminal.

Figure 3:
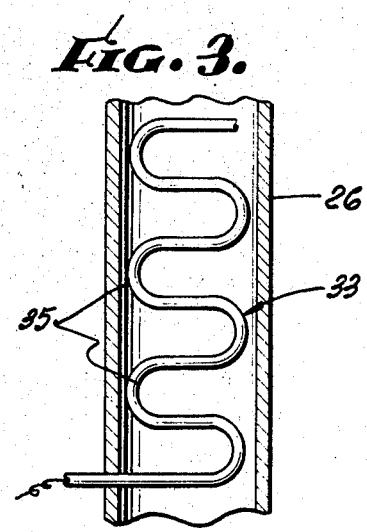
FIG. 3 is an enlarged cross-section on line 3—3 of FIG. 1.

The arrangements described with reference to FIGS. 1 to 3 may be employed for printing upon the surface of flat sheet materials, or objects of other or irregular shapes. Generally it is contemplated that the stencil will be maintained in spaced approximate parallelism with the target surface, although the present invention may tolerate appreciable departures from close parallelism, as distinguished from other systems that require that relation.

While it is contemplated that the stencil during printing may have any desired closeness of approach to the target surface 20, generally it is desirable to maintain at 44 sufficient spacing to preclude contact smearing of the deposited pigment. The spacing at 45 between the launching electrode and stencil however is relatively wide, typically in the range of about 3 to 15 cm., to promote and insure particulate dispersing of the pigment particles for free passage through the stencil openings.

FIG. 4 illustrates an embodiment of the invention having particular applicability to printing upon containers such as bottles, jugs, cans or the like, which may be made of either of conductive or electro-conductive materials. As an important adaptation of the invention, FIG. 4 shows essentially the previously described system as applied to printing upon plastic, e.g. polyethylene, open top bottles 46 shown to be carried to and from the illustrated printing station on appropriate conveyor means 47. Here at the printing station 48 the bottle 46 is shown to be positioned between launching electrodes 49 applied to particle entrainment non-conductive loops 50 about openings 50a, the loops having discharge apertures 51. As before, the launching electrodes are connected by leads 52 to the voltage source negative pole 31, the potentiometer 38 interconnects lead 52 and the grounded lead 53, and is connected by conductor 54 with stencils 55 applied to opposite surfaces of the bottle 46, the stencil apertures 56 being suitably spaced from the bottle surface as by spacers 57 carried by the inside surface of the stencils. The pigment particles are shown to be pre-charged by a wire or equivalent electrode 491 within a grounded conductive section 501 of the loop, the electrode being connected to the negative voltage line 52.

The counter-electrode means is shown diagrammatically to comprise a grounded conductive probe 58 inserted into the bottle through its open top or neck. The bottle may contain an ionizable fluid, liquid or gaseous, although ordinarily the bottle will be empty and open to atmospheric air. Particularly satisfactory results have been obtained using a probe 58 which is inserted only partially or a relatively short distance into the bottle, substantially as illustrated in FIG. 4, and which is pointed to achieve what apparently is an electrical discharge effect probably causing some ionization of the air inside the bottle. Thus, in this instance the partially inserted probe, or the latter together with the ionized state of the air inside the container, become the counter-electrode means.

In operation, a succession of the bottles 46 may be advanced continuously or intermittently to the printing station 48, at which location the stencils 55 will have been brought against the container as in the manner later explained in reference to FIGS. 11 to 13, to receive the pigment particles launched as at 38 so that printing concentrations of the particles are passed through the stencil openings 56 to deposit correspondingly upon opposite surfaces of the bottles.

Figure 7:
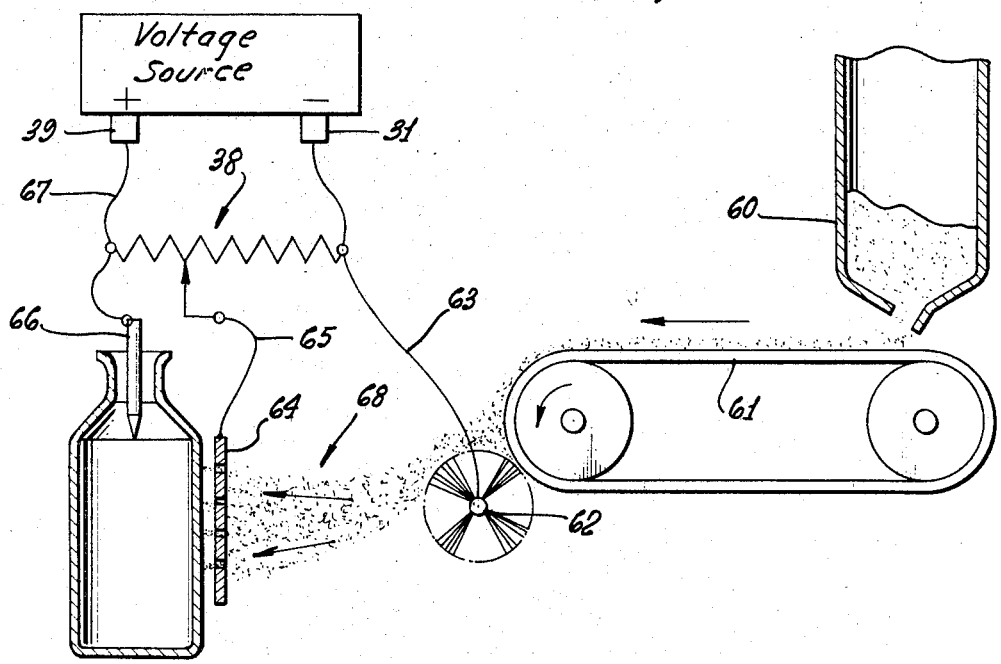
FIG. 7 is a view illustrative of container printing generally similar to FIG. 4 but showing a variational means for launching the pigment particles.

As previously indicated, any of various known means for dispersing charged pigment particles into an electrostatic field, may be employed for purposes of the present invention. As a further typical illustration, FIG. 7 shows the pigment to be dispersed from a container 60 onto belt 61 which delivers the pigment to a rotatably driven conductive brush 62 which is connected at 63 to the negative voltage terminal. In correspondence with FIG. 4, the stencil 64 connects at 65 with the potentiometer 38 and the conductive probe 66 connects at 67 with the positive voltage terminal. Brush 62 operates to negatively charge and disperse the particles into the electrostatic field 68 for passage through the stencil openings onto the bottle surface.

Figure 11:
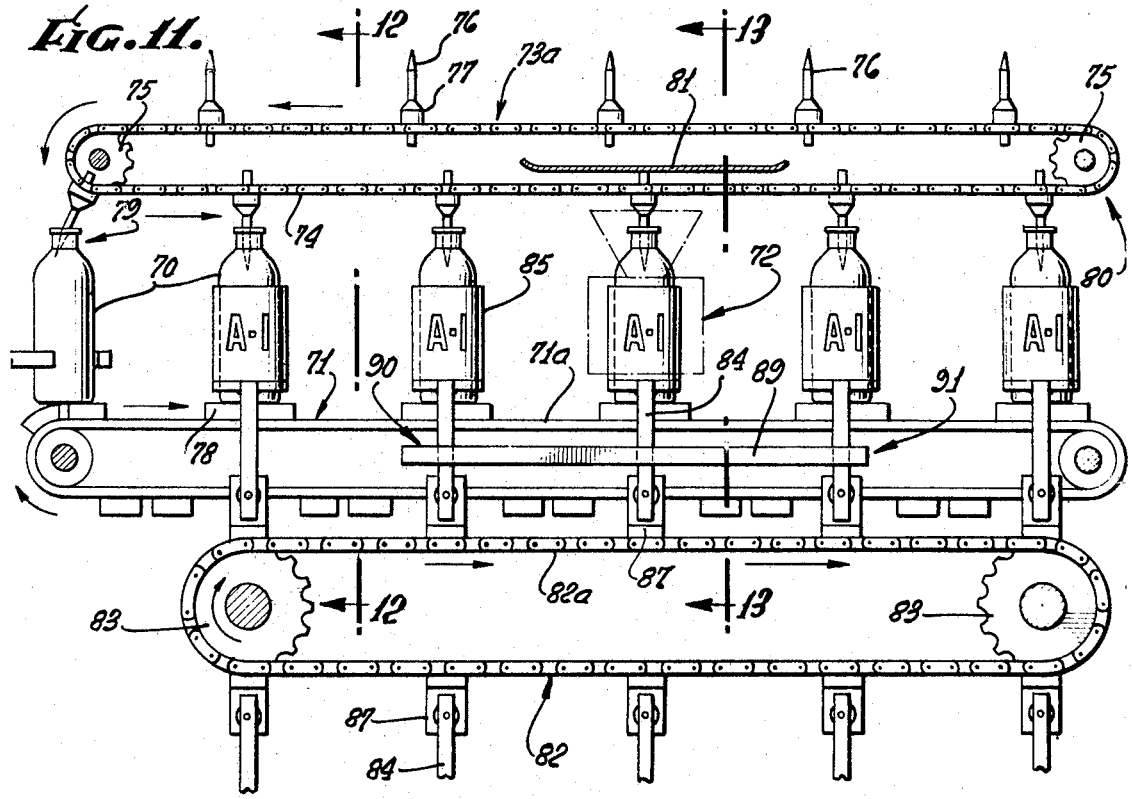
FIG. 11 is a view illustrative of a further embodiment of the invention mechanized for container printing in commercial production.
Figure 13:
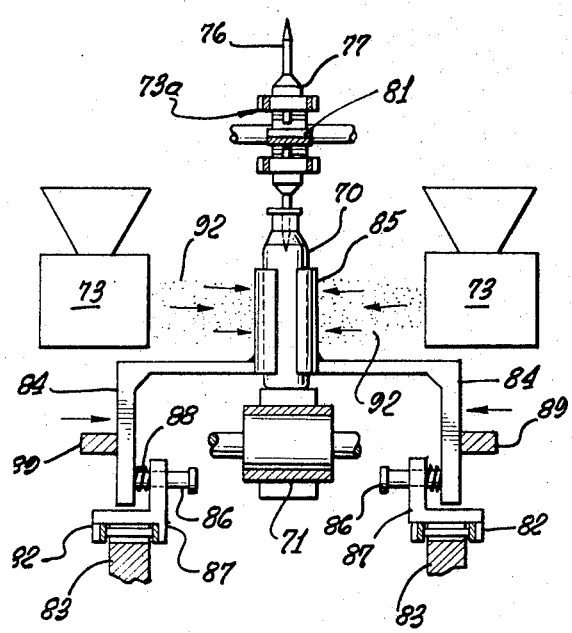
FIGS. 12 and 13 are fragmentary sections taken respectively on lines 12—12 and 13—13 of FIG. 11.
Figure 12:
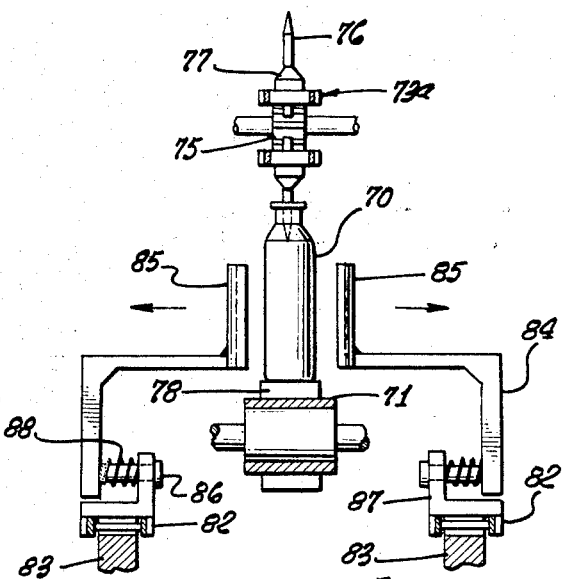

FIGS. 11 to 13 illustrate a further embodiment of the invention mechanized for printing upon containers, such as plastic bottles, in commercial production. Here the bottles 70 are shown to be advanced on conveyor 71 to and from a printing station 72 between launching electrode means that may be of the character previously described and which are diagrammatically indicated at 73 in FIG. 13. Here the conveyor 71 may be assumed to move the containers continuously past the printing station 72. Directly above the conveyor 71 is suitably mounted a carrier 73a which may have the form of a chain 74 extending about sprockets 75, one of which is driven to continuously travel the chain as indicated by the arrows. The chain carries a succession of equally spaced conductive probes 76, corresponding to probe 58 in FIG. 4, which extend through insulative holders 77 and to the inside of the chain as illustrated. The spacing of the probes 76 corresponds to the spacing of bases or holders 78 on conveyor 71, so that as each container advances, as to a location 79, one of the probes 76 enters the container and remains therein until retraction by elevation of the probe at 80 upon being carried upwardly by its conveyor 73. As the inserted probes move past the printing station 72, their upper ends project through the carrier, engaging a conductive plate 81 which may be electrically grounded as in the manner of probe 58 in FIG. 4.

A pair of spaced parallel chain conveyors 82 are carried by sprockets 83 below and at opposite sides of conveyor 71 and are driven to provide upper runs 82a advancing in the same direction and speed as the upper run 71a of conveyor 71. At intervals corresponding to the spacing of the bottle mounts 78 and probes 76, chains 82 carry pairs of opposed arms 84 which mount the stencils 85. Any suitable means may be provided for moving the stencils 85 together and apart from printing association with the bottles 70. Merely as illustrative, the arms are shown to carry pins 86 extending through openings in brackets 87 carried by the chains 82, the arms being urged outwardly by coil springs 88. As the arm and stencil assemblies advance toward the printing station, the arms engage a pair of elongated cams 89 which at the location 90 are engaged by the arms 84, causing the latter and stencils to be displaced together and against the containers from the open condition of FIG. 12 to that of FIG. 13. Upon movement of the arms past the cams as at 91, springs 88 return the stencils to their open spacing.

As the stencils and bottles move past the printing station 72, they enter the electrostatic fields between the launching electrode means 72 and probe 76 or its projected gas ionizing effect inside the bottle, so that as a result of the field creation, the pigment particles are launched as at 92 to immediately pass through the stencil openings and print upon the target surfaces. The launching, field and stencil voltages, and spacing of the stencil with reference to the launching point and target may be as previously and hereinafter described. In FIGS. 11 to 13, the stencils may be assumed to be grounded to the machine.

Determinations have been made of operating conditions generally applicable to all described embodiments of the invention, and which have produced satisfactory results. Such typical conditions may be defined as maintaining a ratio $E_a/E_t$ between about 0.6 to about 3.00 where $$E_a = (V_3 - V_2)/L_a$$

$$E_t = (V_1 - V_2)/L_t$$

$V_1$ being the voltage of the launching electrode (29, 49, 62), $V_2$ the voltage of the counter-electrode or counter-conductive means (36, 42, 58), $V_3$ the voltage of the stencil (19, 55, 85), $L_t$ is the distance between the launching and counter-electrode means, and $L_a$ is the distance between the stencil openings and counter-conductive means. Where the printing target surface serves as the counter-electrode, or has a voltage corresponding substantially to that of an associated counter-electrode, then in the above equations $V_2$ may be considered to be the voltage at that surface, and $L_t$ and $L_a$ are measured in relation to the surface. When the counter-electrode does not conform to the target surface voltage, the field voltage at the surface is determined and used for $V_2$, $L_a$ being the distance between the stencil apertures and the target surface.

In typical instances we have used a launching field strength of about 6,000 v./cm. to about 20,000 v./cm. Essentially the same image may be presented when both the launching field strength ($E_t$) and air gap field strength ($E_a$) are increased by the same factor to maintain a constant ratio $E_a/E_t$. Factors in the selection of field strength are the configuration of the object to be printed, the spacing between the launcher and object and the pigment particle characteristics. It has been found that image of good clarity may be produced using an air gap spacing $L_a$ less than about ¼ inch. However, it is preferable to keep this spacing at around 0.07 inch or less when printing fine details. Generally, the closer the stencil openings are to the target surface, other factors being equal, the sharper the image.

Figure 8:
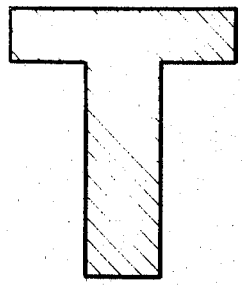
FIGS. 8, 9 and 10 are views diagrammatically illustrative of variations in a printed image, occasioned by variations in certain relationships later to be described.
Figure 9:
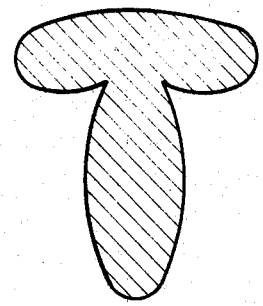
Figure 10:
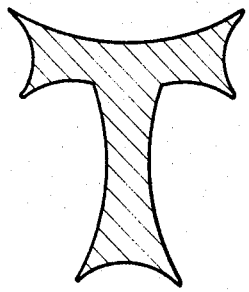

When the ratio $E_a/E_t$ is relatively low, as is in an illustrative situation substantially below 1.0, the resulting image of a large block letter tends to have bulging sides, indistinct edge definition, acute inside corners and rounded outside corners, as for example in FIG. 9. In the same situation, increase of $E_a/E_t$ ratio greater than about 1.8 may produce a narrowing effect with sharply pointed corners as in FIG. 10. With the ratio maintained between about 1.0 and 1.8 the image is a good replication of the stencil aperture in keeping with FIG. 8. As will be recalled from the earlier descriptions, the potentiometer provides a variable control to maintain the desider $E_a/E_t$ field strength.

By varying the stencil potential relative to the object potential, assuming a constant potential between the launching electrode (29, 49, 62) and the counter-electrode (36, 42, 58) the potential in the apertures of the stencil relative to the stencil potential is varied and the printing shape can be varied. The aperture potential i.e. the field strength at the point where the lines of the field extending between the launching electrode and the counter-electrode intersect the plane of the stencil, is dependent on the launching field and independent of the stencil-object field.

The following table shows operating conditions found to be suitable in certain uses of the invention. These values are not to be regarded as limitative but merely illustrative of workable conditions.

low melting and suitably colored resin. The composition of the toner resin does not appear to be critical insofar as electroscopic launching ability and image formation are concerned. A number of electroscopically suitable resins are described in U.S. Pat. No. 3,079,342. We have also found it possible in the electrostatic apparatus and process of this invention, to use an electroconductive powder consisting of flaked polished aluminum powder having a particle size of less than about 40 microns in diameter. The aluminum powder readily produced an image under the same conditions as employed with resin-based pigment particles. However, in this event, the decorative image must be fixed to the surface by other means, as by application to the surface of a resin-based clear coating material. A fine dispersion of a liquid toner can be used in lieu of the pigment powder. When reference is made to a pigment powder herein, it will be understood to include not only materials that may be pigments or dyes themselves, but also resins and other materials to which pigments or dyes are added or otherwise given color. Techniques for fixing or otherwise subsequently treating the printed images are well known in the art.

The electroconductive mask stencil is most advantageously fabricated of thin metal sheet stock. Beryllium-copper or brass shim stock of 0.003 to 0.020 inch thickness are suitable although other conductive and non-conductive materials can be used. The design apertures may be produced mechanically, as by blanking out with suitable dies in a punch press, or chemically or electrochemically, by etching away unmasked areas of the sheet, or by other suitable means.

We claim:

1. Electrostatic printing apparatus comprising means providing a container printing station, means for moving to and from said station a succession of containers to be printed, a particle launching electrode spaced from said station and counter-electrode means moveable into and out of a container at said station, means imposing voltage differential on said launching electrode and counter-electrode means to create an electrostatic field extending to the surface of the container, a moveable apertured stencil in said field and spaced from said launching electrode, means for introducing pigment particles freely into said field between said launching electrode and stencil and at a location spaced from the stencil so that the particles are projected in said field to the stencil and through its apertures to be deposited in corresponding pattern on the container surface, and means for moving said counter-electrode means into and out of the container in timed relation with advancement of the container to and from said printing station.

2. Apparatus according to claim 1, in which said counter-electrode has a pointed terminal which becomes

TABLE I

| Example | Launching Field | | | Air Gap Field | | | Field Strength Ratio, $E_a/E_t$ | Results |
|---|---|---|---|---|---|---|---|---|
| | Length, $L_t$(cm.) | Voltage, $V_1 - V_2$ | Strength, $E_t$(v./cm.) | Length, $L_a$ | Voltage, $V_3 - V_2$ | Strength, $E_a$(v./cm.) | | |
| 1 | 3.6 | −24,000 | −6,660 | 0.1 | −800 | −8,000 | 1.2 | |
| 2 | 3.6 | −7,100 | −1,970 | 0.1 | −237 | −2,370 | 1.2 | |
| 3 | 3.6 | −24,000 | −6,660 | 0.1 | −1000 | −10,000 | 1.5 | Sharp image, accurate in size and shape, uniform pigment powder flow to all size letters. |
| 4 | 3.6 | −7,100 | −1,970 | 0.1 | −296 | −2,960 | 1.5 | |
| 5 | 3.8 | −17,000 | −4,470 | 0.091 | −610 | −6,700 | 1.5 | |
| 6 | 5.1 | −32,000 | −6,280 | 0.092 | −880 | −9,560 | 1.52 | |
| 7 | 3.6 | −24,000 | −6,660 | 0.1 | −1200 | −12,000 | 1.8 | |
| 8 | 3.6 | −7,100 | −1,970 | 0.1 | −355 | −3,550 | 1.8 | |

For the reproduction of a sharply defined, uniformly coated image, a uniformly fine powder is preferred. A suitable toner powder has a particle size of about 5 to 10 microns. A low melting resin powder may be used if it is desired to fix the toner particles by heat on a low melting resin target surface. However, the melting point of the toner should not be so low that the particles sinter in storage at temperatures up to about 150° F. A satisfactory powder is essentially composed of a non-tacky, inserted into the container a short distance in relation to the axial dimension of the container.

3. Apparatus according to claim 1, in which said stencil is moveable and the apparatus includes means for moving said stencil toward and away from the container and with the container all in predetermined timed relation with the printing of said pigment thereon.

4. Apparatus according to claim 1, in which a pair of said stencils are movably positioned at opposite sides of the container and means are provided to duplicate said electrostatic field to project pigment through both stencils, said apparatus including means for moving both stencils toward and away from a container in timed relation with the printings thereon.

5. The method of printing on the surface of a container, that includes moving a succession of the containers to and from a printing station, maintaining an electrostatic field extending from a voltage source outside the container to an electrode adjacent said container at said station to be receivable therein, positioning an apertured stencil in said field and in spaced relation to said voltage source and said container, introducing powdered pigment to said field at a location spaced from the stencil and moving said electrode into and out of said container through an opening therein in timed relation with introducing pigment into the field so that pigment particles are launched into said field and pass through the stencil apertures and deposit and print in corresponding pattern on the container surface.

6. The method of claim 5, in which a pair of said stencils are movably positioned at opposite surfaces of a container at said station, two of said electrostatic fields being maintained between a pair of said high voltage sources and a single electrode inside the container, printing pigments being fed separately to said electrostatic fields, and in which said stencils are moved relatively toward and away from the containers in timed relation with the pigment printing thereon.

7. The method of claim 5, in which the container is made of organic plastic material.

8. The method of claim 5, in which said pigment is introduced to a launching location in said field at said voltage source.

9. The method of claim 8 in which said containers are continuously advanced to and from said station and in which a travelling succession of said electrodes are moved individually into and out of respective containers.

10. The method of claim 9, in which a pair of said stencils are movably positioned at opposite surfaces of a container at said station, said electrostatic field being maintained between said high voltage source and a single electrode inside the container, printing pigments being fed to both stencils, and in which said stencils are moved relatively toward and away from the containers in timed relation with the pigment printing thereon.

11. Method of printing on the surface of an object that includes providing a stencil having printing image defining nonreticulated apertures, electrostatically transferring printing particles through said stencil apertures for deposit on said surface in corresponding pattern, and controlling the potential in said apertures relative to said surface separately from the potential of the stencil to that surface by maintaining one electrostatic field between said stencil and said object surface and a second electrostatic field extending to the object surface from behind and through said stencil and transferring said particles with said second field.

12. Method according to claim 11 including controlling said aperture potential to be the same as the stencil potential relative to the object surface.

13. Method according to claim 11 including predispersing said printing particles in said second electrostatic field for transfer thereby through said stencil apertures to said object surface.

14. Apparatus for printing on the surface of an object comprising stencil means having a nonreticulated aperture, means for electrostatically transferring printing particles through said stencil aperture for deposit on said surface in corresponding pattern including a potential applied between the stencil and said surface and means independent of said stencil including an electrode on the side of said stencil remote from said object having a potential with respect to said object to control the potential within the aperture space relative to said surface.

15. Apparatus according to claim 14 in which said stencil apertures are electrically discontinuous relative to the stencil.

16. Apparatus according to claim 14 including also counter-electrode means behind the object surface to form said electrostatic transfer means with said electrode.

17. Apparatus according to claim 16 including also means for controlling the potential of the stencil relative to said object surface.

18. Apparatus according to claim 17 including also means for introducing printing particles to said stencil means for electrostatic transfer through the stencil apertures to deposit on said object surface.

19. The method of printing on the surface of an object, that includes moving a succession of the objects to and from a printing station, maintaining one electrostatic field between a first electrode positionable behind the object surface and a second electrode in spaced, opposed relation with the object surface, positioning a nonreticulated aperture stencil in said one field maintaining another electrostatic field between said object surface and said stencil, introducing printing particles to said one field between the stencil and the second electrode and relatively positioning said first electrode and said object at the printing station in timed relation with introducing printing particles into said one field so that said particles are launched through the stencil apertures and through said other field to print in corresponding pattern on the object surface.

References Cited

UNITED STATES PATENTS

| 2,787,556 | 4/1957 | Haas. |
| 2,940,864 | 6/1960 | Watson. |
| 3,081,698 | 3/1963 | Childress et al. |
| 3,273,496 | 9/1966 | Melmon. |
| 3,285,167 | 11/1966 | Childress et al. |
| 3,295,440 | 1/1967 | Rarey et al. |
| 3,296,963 | 1/1967 | Rarey et al. |
| 3,321,768 | 5/1967 | Byrd. |
| 3,413,917 | 12/1968 | Fisher et al. _____ 101—426 XR |

FOREIGN PATENTS

| 81,920 | 9/1956 | Denmark. |

EDGAR S. BURR, Primary Examiner

U.S. Cl. X.R.

101—129